United States Patent [19]

Antonelli et al.

[11] Patent Number: 4,849,480

[45] Date of Patent: Jul. 18, 1989

[54] CROSSLINKED POLYMER MICROPARTICLE

[75] Inventors: Joseph A. Antonelli, Riverton, N.J.; Joseph E. McLaughlin, Philadelphia; Clifford H. Strolle, Springfield, both of Pa.

[73] Assignee: E. I. Du Pont de Nemours and Company, Wilmington, Del.

[21] Appl. No.: 106,660

[22] Filed: Oct. 13, 1987

Related U.S. Application Data

[62] Division of Ser. No. 790,494, Oct. 23, 1985, abandoned.

[51] Int. Cl.$^4$ .................. C08F 257/02; C08F 265/04; C08F 265/06
[52] U.S. Cl. .................................. 525/303; 525/304; 525/305; 525/902
[58] Field of Search ................ 525/303, 304, 305, 902

[56] References Cited

U.S. PATENT DOCUMENTS

| | | | |
|---|---|---|---|
| 3,069,375 | 12/1962 | Bullitt, Jr. | 260/29.3 |
| 3,502,745 | 3/1970 | Minton | 525/309 |
| 3,787,522 | 1/1974 | Dickie et al. | 525/902 |
| 3,793,282 | 2/1974 | Fock et al. | 525/303 |
| 3,793,402 | 2/1974 | Owens | 525/902 |
| 3,808,180 | 4/1974 | Owens | 525/296 |
| 3,821,145 | 6/1974 | Walus | 525/80 |
| 3,895,082 | 7/1975 | Hochberg | 260/885 |
| 3,925,510 | 12/1975 | Ide et al. | 525/902 |
| 3,929,693 | 12/1975 | Hochberg | 260/17 R |
| 4,220,679 | 9/1980 | Backhouse | 427/401 |
| 4,290,932 | 8/1981 | Wright et al. | 260/29.6 |
| 4,336,177 | 6/1982 | Backhouse et al. | 523/201 |
| 4,337,189 | 6/1982 | Bromley et al. | 523/332 |
| 4,377,661 | 3/1983 | Wright et al. | 524/522 |
| 4,391,858 | 7/1983 | Batzill | 427/407 |
| 4,419,465 | 12/1983 | Backhouse et al. | 523/201 |
| 4,477,536 | 10/1984 | Wright et al. | 428/522 |
| 4,493,914 | 1/1985 | Chattha | 523/436 |
| 4,530,957 | 7/1985 | Theodore et al. | 524/504 |

FOREIGN PATENT DOCUMENTS

967051  1/1963  United Kingdom .

*Primary Examiner*—Carman J. Seccuro
*Attorney, Agent, or Firm*—Hilmar L. Fricke

[57] ABSTRACT

Crosslinked polymer microparticles that have a particle size of about 0.1–5 microns of polymerized monomers of styrene, alkyl methacrylate having 1–12 carbons in the alkyl group, alkyl acrylate having 1–12 carbon atoms in the alkyl group and mixtures thereof, about 0.1–5% by weight of a crosslinking monomer of an alkylene glycol dimethacrylate or diacrylate each having 1–8 carbon atoms in the alkyl group and about 0.1–5% by weight of allyl methacrylate or allyl acrylate; said polymer having a weight average molecular weight of about 500,000 to 5,000,000; polymeric chains are grafted onto the polymer microparticles; the microparticles are useful as additives for coating compositions to control rheology and in particular for metallic pigment flake and sag control.

5 Claims, No Drawings

CROSSLINKED POLYMER MICROPARTICLE

CROSS-REFERENCE TO RELATED APPLICATIONS

This application is a divisional application of Ser. No. 790,494, filed Oct. 23, 1985, now abandoned.

BACKGROUND OF THE INVENTION

This invention is related to a polymer additive for coating compositions that controls the application rheology of the composition.

Conventional coating compositions of a high molecular weight acrylic polymer and melamine crosslinking resins are well known in the art as shown by Vasta U.S. Pat. No. 3,622,651, issued Nov. 23, 1971; Hick U.S. Pat. No. 3,841,895, issued Oct. 15, 1974; Parker U.S. Pat. No. 3,674,734, issued July 4, 1972 and Parker U.S. Pat. No. 3,637,546, issued Jan. 25, 1972. These patents show quality coating compositions but these compositions have a relatively high solvent content to provide for good application properties and good properties of the resulting dried finish. To utilize these compositions in areas which have strict air pollution regulations; pollution abatement equipment is required. This equipment is expensive and increases capital investment of a plant and is costly to operate. Any attempt to reduce the solvent content of these conventional compositions generally results in finishes which have either a poor appearance or unacceptable properties or both.

In an effort to obtain high solids coating compositions that can be applied by conventional spraying techniques, the molecular weight of the polymer used in these compositions was reduced substantially and solvent content of the coating compositions was reduced. The reduction in molecular weight caused problems of poor appearance, sagging of the finish on application, pulling away from edges after application and cratering of the finish. When aluminum flake pigments were used in these composition, poor appearance was caused by improper orientation of the aluminum flake in the finish.

U.S. Pat. No. 4,419,465 and 4,336,177 of Backhouse et al. show dispersions of composite polymer microparticles that can be added to coating compositions. However, these microparticles have graft sections of a high molecular weight e.g., 50,000 and higher. These microparticles do not provide the required rheology control for coating compositions on application, particularly for those compositions used for automotive and truck finishes.

There is a great need for rheology control additive for high solids coating compositions that provides a reduced viscosity under typical spraying conditions when the coating composition is applied and provides a substantially increased viscosity after application which prevents sagging and cratering of the resulting finish. Also, the additive should reduce any pulling away of the finish from edges and provide proper orientation of metallic flakes used in the coating. High solids coating compositions containing such an additive will have an overall appearance that is acceptable particularly for exterior finishes of automobiles and trucks.

SUMMARY OF THE INVENTION

Crosslinked polymer microparticles that have a particle size of about 0.1–5 microns are of polymerized monomers from the group of styrene, alkyl methacrylate alkyl acrylate, each having 1–12 carbon atoms in the alkyl group or mixtures thereof, about 0.1–5% by weight of a crosslinking monomer of an alkylene glycol dimethacrylate or diacrylate each having 1–8 carbon atoms in the alkylene group, and about 0.1–5% by weight of allyl methacrylate or allyl acrylate; the polymer has a weight average molecular weight of about 500,000 to 5,000,000; polymeric chains having a weight average molecular weight of less than 20,000 are grafted onto the polymer microparticles; these microparticles are used in coating compositions as a rheology control additive; processes for making these microparticles and coating compositions that contain such microparticles that control the rheology of the coating composition, also are part of this invention.

DESCRIPTION OF THE INVENTION

The crosslinked polymer microparticles used as rheology control additives for coating composition including paints have a particle size of about 0.1–5 microns. The polymer has a weight average molecular weight of about 500,000–5,000,000 measured by gel permeation chromatography using polymethyl methacrylate as the standard.

The polymer contains 0.1–5% by weight of allyl methacrylate or acrylate and also 0.1–5% by weight of polymerized crosslinking monomers of alkylene glycol dimethacrylate or diacrylate. Other monomers that can be used to form the polymer are styrene, alkyl methacrylate, and alkyl acrylate or mixtures thereof each having 1–12 carbon atoms in the alkyl group.

Side chains can be grafted onto the polymer through residual allyl groups to provide a microparticle with a core/graft structure.

These side chains are grafted onto the core through residual allyl groups from allyl methacrylate or acrylate used to form the core of the microparticles. These allyl groups survive the polymerization process used to form the polymer. Typical monomers used to form the side chain are styrene, alkyl methacrylates, alkyl acrylates each having 1–12 carbon atoms in alkyl groups or mixtures thereof. Also, hydroxy containing monomers such as hydroxy alkyl acrylate or methacrylates can be use. Typical hydroxy alkyl acrylates and methacrylates have 1–4 carbon atoms in the alkyl group. Generally, these side chains have a weight average molecular weight measured as above, of less than 20,000 and preferably 3,000–18,000.

Microparticles having side chains grafted thereto preferably contain 40–80% by weight of core and 20–60% by weight side chains. One preferred microparticle contains 30–40% by weight of said chains and 60–70% by weight core.

Typical alkylene glycol dimethacrylate or diacrylate crosslinking monomers used to prepared the microparticles are as follows: 1,4 butane diol diacrylate, 1,4 butane diol dimethacrylate, ethylene glycol diacrylate, ethylene glycol dimethacrylate, propylene glycol diacrylate, propylene glycol dimethacrylate, hexane diol diacrylate, hexane diol dimethacrylate, octane diol diacrylate, octane diol dimethacrylate, trimethylol propane triacrylate, pentacrythritol tri and tetra acrylate and the like.

The microparticles contain about 0.1–5% by weight and preferably 1–4% by weight of allyl acrylate or allyl methacrylate.

Typical monomers used for both the core and side chains are styrene, alkyl acrylates or methacrylates such as methyl methacrylate, ethyl methacrylate, propyl methacrylate, butyl methacrylate, pentyl methacrylate, hexyl methacrylate, octyl methacrylate, nonyl methacrylate, decyl methacrylate, lauryl methacrylate, methyl acrylate, ethyl acrylate, propyl acrylate, butyl acrylate, pentyl acrylate, hexyl acrylate, octyl acrylate, nonyl acrylate, decyl acrylate, lauryl acrylate and the like.

Typical hydroxy alkyl acrylates or methacrylates that can be used in side chains are hydroxy ethyl acrylate, hydroxy propyl acrylate, hydroxy butyl acrylate, hydroxy ethyl methacrylate, hydroxy porpyl methacrylate, hydroxy butyl methacrylate and the like.

The following are preferred microparticle compositions:

core of methyl methacrylate, butyl methacrylate, styrene, 1,4 butane diol dimethacrylate and allyl methacrylate and side chains grafted to the core of styrene, ethyl methacrylate, lauryl methacrylate and hydroxy ethyl acrylate;

core of styrene, butyl acrylate, butane diol dimethacrylate and allyl methacrylate and the side chains grafted to the core of methyl methacrylate, ethyl methacrylate, lauryl methacrylate and hydroxy ethyl acrylate;

core of styrene, butyl acrylate, butane diol dimethacrylate and allyl methacrylate and side chains grafted to the core of styrene, butyl acrylate, butyl methacrylate, hydroxy ethyl acrylate and hydroxy propyl methacrylate.

The microparticles are prepared by emulsion polymerization in which the monomers are polymerized in an aqueous medium at about 40° to 100° C. for about ¾ to 4 hours. The resulting product is an aqueous latex or emulsion.

Typical catalysts that are used are ferrous salts and/or organic peroxides, ferrous salts and hydro peroxides, hydrogen peroxide and ferrous salts, potassium persulfate, sodium sulfate or ammonium sulfate. Redox systems also can be used such as bisulphite/persulfate, ferrous salts with persulfate and combinations of chlorates and bisulfites.

To aid in formation of micelles, electrolytes are added such as sodium chloride, potassium chloride, potassium sulfate, potassium peroxy disulfate, potassium acid phosphate, sodium nitrate, sodium perchlorate, tetra sodium pyrophosphate and other alkali metal phosphates.

About 0.1-3% by weight, based on the weight of monomers used to form the microparticles, of an anionic surfactant, such as sodium lauryl sulfate, is used.

The resulting dispersion or emulsion then is coagulated by addition of a salt such as sodium chloride or other salts as shown above.

The resulting coagulum is filtered, washed, dried and pulverized to form microparticles. The microparticles are then dispersed in an organic medium that is compatible with the paint or coating composition to which the dispersion is to be added.

Instead of coagulating the latex or emulsion, non-aqueous dispersion can be formed by azotropic distillation. The latex is added to an organic azotropic liquid such as xylene, toluene, 'SolVesso' 100, methylamyl ketone, methyl isobutyl ketone, hexane or cyclohexane. As the latex is added the resulting composition is heated to its reflux temperature and water is removed to form a non-aqueous dispersion.

After the non-aqueous dispersion is formed, side chains can be grafted onto the microparticles. This is accomplished by the addition of ethylenically unsaturated monomers that form the side chains and polymerization catalysts such as t-butyl peracetate and heating to about 100° to 170° C. for about 1 to 8 hours.

Preferably, the resulting dispersion has a ratio of Brookfield viscosity measured at 0.2 RPM at 25° C. to Brookfield viscosity measured at 20 RPM of 5–100 preferably, 10–30. In order to obtain aluminum flake control, the dispersion should have the above ratio. This insures that the dispersion will have non-Newtonian behavior and the degree of shear thinning necessary to provide rheology control on application and control of aluminum flake pigments used in the dispersion.

The microparticles can be used in a variety of high solids coating compositions in amounts of about 0.1–15% by weight, based on the weight of the binder of the coating composition. The advantages of using the microparticle in high solids coating compositions are as follows: the composition can be sprayed at a high solids level without sagging and running on the substrate to which it was applied; upon baking of the composition after application, the finish does not pull away from the edges of the substrate; craters are substantially reduced; the resulting finish has excellent gloss and a good appearance; when metallic flakes are used in the composition, the flakes are properly oriented and uniformly dispersed in the finish with a good two tone image and with little or no evidence of mottling caused by agglomeration of the metallic flakes. Also, the microparticles are stable in the composition.

Typical high solids coating compositions in which microparticles are used have a binder content of film forming constituents of about 40–70% by weight. Generally, the composition has a binder content of about 50–65%. The composition contains about 30–60% by weight of a liquid carrier which generally is solvent for the binder. The composition can be clear or contain about 0.1–30% by weight, based on the weight of the composition, of pigment.

Typical high solids coating compositions in which the microparticles can be used have as the binder of film forming constituents the following: acrylic polymers with reactive groups such as hydroxyl, carboxyl, glycidyl or amide and a crosslinking resin such as an alkylated melamine formaldehyde resin or a polyisocyanate, a blend of acrylic and polyester resins and the aforementioned crosslinking resins, hydroxyl terminated polyester resin and the aforementioned crosslinking agents, epoxy resins or epoxy ester and alkylated melamine formaldehyde crosslinking resins, alkyd resins with or without drying oil groups which can be blended with alkylated melamine formaldehyde resins or polyisocyanates or other film forming binders.

One preferred binder of the coating composition comprises an acrylic polymer having carboxyl, hydroxy, amide or glycidyl groups and a number average molecular weight of about 500–30,000 and an alkylated melamine formaldehyde crosslinking agent. Generally, the composition contains about 0.1–2.0% by weight based on the weight of the binder of an acid catalyst.

To improve weatherability of finishes of the coating compositions, about 0.1–10% by weight, based on the weight of the binder, of an ultraviolet light stabilizer or a combination of ultraviolet light stabilizers can be added. Also, about 0.1–5% by weight, based on the weight of the binder, of an antioxidant can be added. Weatherability of finishes of coating compositions containing aluminum flake are particularly enhanced by the addition of ultraviolet light stabilizers and antioxidants.

Also, about 0.1–10% by weight, based on the binder, of iron pyrophosphate can be added with ultraviolet light stabilizers and antioxidants to improve weatherability of finishes. Typically useful ultraviolet light stabilizers and antioxidants are disclosed in U.S. Pat. No. 4,455,331, issued 6/19/84, which is hereby incorporated by reference.

The coating composition containing the microparticles of this invention can be applied over a variety of substrates, such as metal, wood, glass, plastics, and the like, by any of the conventional application methods, such as spraying, electrostatic spraying, dipping, brushing, flow-coating and the like. The viscosity of the composition can be adjusted for any of these methods by adding solvents if necessary. Generally, the composition is utilized at a high solids content which keeps air pollution at a minimum level.

The coatings are baked at relatively low temperatures of about 65°–140° C. for about 15 minutes to 2 hours. The resulting finish is about 0.1–5 mils thick but for most uses, a 1–3 mil thick finish is used. One technique that is used to insure that there will be no popping or cratering of the finish is to allow the solvents to flash off for about 15–30 seconds before a second coating is sprayed on or otherwise applied, then waiting from about 2–10 minutes before baking the coating to allow any residual solvents to flash off. The resulting finish has good gloss and can be rubbed or polished with conventional techniques to improve the smoothness, appearance and gloss. The finish has good adhesion to substrates of all types, is hard and resistant to weathering, solvents, alkali, scratches and the like. These characteristics make the composition particularly useful as a finish for automobiles, trucks, airplanes, railroad equipment machines, outdoor equipment such as bridges, water tanks, gas tanks and the like.

Another aspect of this invention is to utilize the coating compositions containing the microparticles as a clear coat/color coat finish for substrates. In this finish, a clear coat top layer is in firm adherence to a color coat layer that is adherence with a substrate. The clear coat is a transparent film of the coating composition and the color coat contains pigments in a pigment to binder ratio of about 1/100 to 150/100 and other additives.

Optionally, the color coat can contain about 0.1–10% by weight, based on the weight of the binder of the color coat, of an ultraviolet light stabilizer. Another option is that the color coat and the clear coat each can contain about 0.1–10% by weight, based on the weight of the binder of the coat, of an ultraviolet light stabilizer. Also, the clear coat or the color coat can contain about 0.1–5% by weight, based on the weight of the binder of the coat, of an antioxidant. When an antioxidant is used, the ratio of ultraviolet light stabilizer to antioxidant is about 1:1 to about 50:1.

The thickness of the fully cured color coat and clear coat can vary. Generally, the color coat is about 0.4–1.5 mils thick and preferably 0.6–1.0 mils thick and the clear coat is about 0.5–6.0 mils thick and preferably 0.8–1.5 mils thick. Any of the conventional pigments can be used in the color coat including metallic flake pigments. The clear coat can also contain transparent pigments that have the same refractive index as the binder of the clear coat and have a small particle size of about 0.15–50 microns. Typical pigments that can be used in a pigment to binder weight ratio of about 1/100 to 10/100. Typically, silica pigments are used that have a refractive index of about 1.4–1.61.

The clear coat/color coat finish is applied by conventional spraying techniques and preferably, the clear coat is applied to the color coat while the color coat is still wet. Other conventional application techniques can be used such as brushing, roller coating, electrostatic spraying and the like. The finish is then dried at ambient temperatures or can be used as indicated above.

The following examples illustrate the invention. All parts and percentages are on a weight basis unless otherwise indicated. Molecular weights are determined be gel permeation chromatography.

EXAMPLE 1

The following constituents were charged into a reaction vessel equipped with a stirrer, heating mantle and a reflux condenser:

|  | Parts by Weight |
|---|---|
| Portion 1 | |
| Water | 3360.0 |
| Sodium lauryl sulfate | 20.0 |
| Portion 2 | |
| Styrene monomer | 164.8 |
| Butyl methacrylate monomer | 255.4 |
| Methyl methacrylate monomer | 395.6 |
| 1,4 butane diol dimethacrylate monomer | 4.1 |
| Allyl methacrylate monomer | 4.1 |
| Portion 3 | |
| Potassium Peroxydisulfate | 10.0 |
| Portion 4 | |
| Potassium acid phosphate | 10.0 |
| Total | 4224.0 |

Portion 1 was heated to 80° C. and then Portions 3 and 4 with about 25% of Portion 2 which was premixed were added and the remainder of Portion 2 was added at a uniform rate during the next 1.5 hours while maintaining the temperature at 82°–89° C.

The resulting mixture was then held at 80°–85° C. for 2 hours and cooled to room temperature.

The resulting latex had a polymer solids content of about 20% by weight and the latex polymer was 48% methyl methacrylate, 31% butyl methacrylate, 20% styrene, 0.5% 1,4-butane diol diacrylate and 0.5% allyl methacrylate. The polymer had a weight average molecular weight of about 1,500,000 and a number average molecular weight of about 500,000.

Sodium chloride was added to the latex to precipitate the polymer. The precipitated polymer was thoroughly washed with water and then dried at 50° C. for 12 hours to form a polymer powder. The resulting polymer powder then was dispersed in propylene glycol mono ethyl ether acetate to form a dispersion of polymer microparticles.

A base coating composition was prepared by mixing together the following constituents:

|  | Parts by Weight |
|---|---|
| Portion 1 | |
| Acrylourethane Resin Solution (70% solids of an acrylourethane resin of 65% butyl methacrylate/hydroxy ethyl methacrylate/lauryl methacrylate, 26% polycaprolactone diol, 2% butanol and 7% trimethyl hexamethylene diisocyante) | 88.23 |
| Methylated/butylated melamine | 35.00 |

|  | Parts by Weight |
|---|---|
| formaldehyde resin (fully methylated and butylated melamine formaldehyde resin having a butoxy/methoxy ratio of 1:1 and a degree of polymerization of about 1–1.2) | |
| Blocked sulfonic Acid solution (33% solids in methanol of dodecyl benzene sulfonic acid blocked with dimethyl oxazolidine. molar ratio of acid: dimethyl oxazolidine is 1.52:1) | 2.00 |
| Aluminum Paste (65% flake aluminum in mineral spirits) | 23.44 |
| Glycol monomethyl ether acetate | 30.00 |
| Portion 2 | |
| Dispersion of polymer microparticles (prepared above) | 20.57 |
| Total | 200.64 |

Portion 1 was charged into a mixing vessel and thoroughly mixed and then Portion 2 was added and thoroughly mixed with Portion 1. The resulting composition was reduced with glycol monomethyl ether acetate to a 20 sec. viscosity measured with a #2 Fisher cup.

The above base coating composition was sprayed onto primed aluminum panels. The composition did not sag or run but exhibited excellent rheology control. A clear acrylic coating composition of an acrylic polymer and melamine formaldehyde crosslinking agent was then sprayed over the above applied composition and the panels were baked at 120° C. for 30 minutes to form a base coat/clear coat on the panels. The panels had a base coat thickness of about 0.5 mils and a clear coat thickness of about 1.7 mils. The resulting coating had distinctness of image of 89.2, a gloss measured at 20 degrees of 91.4 and L value measured with a colorimeter of 119.8 and a flop index of 9.5.

In general, the panels had an excellent appearance and the coating would be considered commercially useful for the exterior of automobiles and trucks.

A clear coating composition was prepared by blending together the following constituents:

|  | Parts by Weight |
|---|---|
| Acrylic polymer solution (70% solids of a polymer of styrene/butyl methacrylate/butyl acrylate/hydroxy propyl acrylate, weight ratio, 14.5/29/16.2/37) | 51.45 |
| Methylated/butylated melamine formaldehyde resin (described above) | 39.00 |
| Blocked sulfonic acid solution (described above) | 2.00 |
| Naphtha (Boiling point 150–190° C.) | 5.0 |
| Non-aqueous resin dispersion (blend of acrylic resins of styrene/ butyl acrylate/ hydroxy ethyl acrylate/acrylic acid/ethyl methacrylate, styrene/butyl acrylate/ hydroxy ethyl acrylate/acrylic acid/ ethyl methacrylate/glycidyl methacrylate and styrene/methyl acrylate/methyl methacrylate/hydroxy ethyl acrylate/methacrylic acid/glycidyl methacrylate in organic solvent mixture) | 33.13 |
| Dispersion of Polymer Microparticles (prepared above) | 28.57 |
| Silicone Solution (2% solution) | 3.00 |
|  | Parts by Weight |
|---|---|
| Total | 162.15 |

The above constituents are thoroughly blended together and then reduced with naphtha to a 40 second viscosity measured using a #2 Fisher cup.

The above prepared base coating composition was sprayed onto suitably primed aluminum panels and then the above prepared clear coating was applied. The compositions did not run or sag but exhibited excellent rheology control. The panels were baked at 120° C. for 30 minutes. The panels had a base coat thickness of about 0.6 mils and a clear coat thickness of about 1.4 mils. The panels had a distinctness of image of 45.1, a head on brightness measured with a spectrophotometer of 123.24 and a flop index of 10.51. In general, the panels had an excellent appearance and the coating would be considered commercially useful for the exterior of automobiles and trucks.

EXAMPLE 2

Grafted polymeric microparticles were prepared as follows:

|  | Parts by Weight |
|---|---|
| Portion 1 | |
| Polymer Powder (prepared in Example 1) | 332.00 |
| Xylene | 2779.00 |
| Butanol | 117.00 |
| Portion 2 | |
| Styrene monomer | 44.75 |
| Ethyl methacrylate monomer | 44.75 |
| Lauryl methacrylate monomer | 35.80 |
| Hydroxy ethyl acrylate monomer | 53.70 |
| t-Butyl peracetate | 8.48 |
| Total | 3415.48 |

Portion 1 was charged into a polymerization vessel equipped as in Example 1 and the constituents were heated to reflux temperature of about 133° C. Portion 2 was premixed and added over a three hour period while maintaining the reflux temperature and then held at its reflux temperature for an additional 2 hours. The resulting composition was cooled to ambient temperatures and filtered.

The resulting dispersion of polymer microparticles had a solids content of 25%. The core is about 65% of the polymer microparticles and the grafted polymeric chains are about 35% of the microparticles. The core contains 48% methyl methacrylate, 31% butyl methacrylate, 20% styrene, 0.5% 1,4-butane diol dimethacrylate and 0.5% allyl methacrylate and the grafted polymeric side chains grafted via the allyl groups contain 25% styrene, 25% ethyl methacrylate, 20% lauryl methacrylate and 30% hydroxy ethyl acrylate.

A pigmented coating composition was prepared by blending together the following constituents:

|  | Parts by Weight |
|---|---|
| Portion 1 | |
| Aluminum flake mill base | 2.580 |
| Titanium dioxide mill base | 0.339 |
| Phthalolcyanine blue mill base | 0.579 |

-continued

|  | Parts by Weight |
|---|---|
| Violet lake mill base | 0.928 |
| Portion 2 | |
| Dispersion of polymer microparticles (prepared in Example 1) | 31.250 |
| Acrylourethane resin solution (described in Example 1) | 12.857 |
| Polyester resin solution | 48.235 |
| Methylated/butylated melamine formaldehyde resin (described in Example 1) | 40.000 |
| "Tinuvin"328 (alkyl substituted benzotriazole light stabilizer) | 2.0 |
| "Tinuvin"GCL-079 (hindered amine light stabilizer) | 2.5 |
| Catalyst solution (40% solids in methanol of dodecyl benzene sulfonic acid blocked with dimethyl oxazolidine) | 2.5 |
| Total | 143.768 |

Portion 1 was mixed together and then added to Portion 2 to form a coating composition. The resulting composition had a Brookfield Viscosity measured at 2 RPM of 1900 centipoises and at 20 RPM of 780 centipoises and had a ratio of Brookfield Viscosity measured at 0.2 RPM/Brookfield Viscosity measured at 20 RPM of 8.7.

The paint was reduced to a spray viscosity and sprayed onto a primed steel panel and baked at 120° C. for 30 minutes. The resulting coating had a gloss measured at 20° C. of 52.6 and in general had an acceptable appearance.

EXAMPLE 3

The following constituents were charged into a reaction vessel equipped as in Example 1:

|  | Parts by Weight |
|---|---|
| Portion 1 | |
| Water | 3360 |
| Sodium lauryl sulfate (30% aqueous solution) | 20 |
| Portion 2 | |
| Butyl acrylate monomer | 604.8 |
| Styrene monomer | 171.2 |
| 1,4 butane diol dimethacrylate monomer | 12.0 |
| Allyl methacrylate | 12.0 |
| Total | 4200.4 |

Portion 1 was charged into the reaction vessel and heated to 80° C. About 25% of Portion 2 was then added and then Portion 3 was added and mixed 5 minutes. The remainder of Portion 2 was added over a 90 minute period while maintaining the temperature at 80° C. and then held at this temperature for an additional 2 hours. A latex was prepared.

Water was removed from the latex by using the following azotropic distillation procedure:

|  | Parts by Weight |
|---|---|
| Xylene | 2458.0 |
| Latex (prepared above) | 1578.9 |

The xylene was charged into a reaction vessel equipped as above and heated to about 95° C. Then the latex was slowly added while water was removed and then held at this temperature for 5 hours until all water was removed to form an organic polymeric dispersion.

A grafted polymer microparticle dispersion was prepared by adding the following constituents to the above prepared polymeric dispersion:

|  | Parts by Weight |
|---|---|
| Portion 1 | |
| Styrene | 40.375 |
| Ethyl methacrylate | 40.375 |
| Lauryl methacrylate | 32.300 |
| Hydroxyethyl acrylate | 48.450 |
| Portion 2 | |
| t-Butyl peracetate | 7.660 |
| Xylene | 154.000 |
| Total | 323.16 |

Portion 1 was added to the polymer dispersion over a 3 hour period along with Portion 2. The temperature was held at about 139° C. Then the composition was cooled to room temperature. The resulting grafted polymer microparticle dispersion had a solids content of about 13.65%.

The dispersion had a ratio of Brookfield viscosity measured at 0.2 RPM/Brookfield viscosity measured at 20 RPM of 21.6.

The dispersion was added in the same solids amount to the base coating composition described in Example 1 in place of the dispersion used in Example 1. The resulting paint was reduced to a spray viscosity and sprayed onto a primed steel substrate and a clear coating was applied and baked as in Example 1. The resulting finish had acceptable gloss and appearance and is acceptable as an automotive coating composition.

EXAMPLE 4

By using the same procedures as in Example 3, the following microparticle polymer dispersions were prepared:

| | Grafted Polymer Microparticle | | | | % Solids |
|---|---|---|---|---|---|
| I. | Core - | 65% | Graft - | 35% | 15 |
| | S | 21.4% | S | 25% | |
| | BA | 75.6% | ETMA | 25% | |
| | 1,4BDDA | 1.5% | LMA | 20% | |
| | AM | 1.5% | HEA | 30% | |
| II. | Core - | 65% | Graft - | 35% | 25 |
| | MMA | 20.8% | MMA | 25% | |
| | BA | 73.4 | ETMA | 25% | |
| | 1,4BDDA | 2.9% | LMA | 20% | |
| | AM | 2.9% | HEA | 30% | |
| III. | Core - | 41% | Graft - | 59% | 25 |
| | Constituents | | Constituents | | |
| | Same as II above | | Same as II above | | |
| IV. | Core - | 65% | Graft - | 35% | 25 |
| | S | 20.8% | S | 25% | |
| | BA | 73.4% | ETMA | 25% | |
| | 1,4BDDA | 2.9% | LMA | 20% | |
| | AM | 2.9% | HEA | 30% | |
| V. | Core - | 65% | Graft - | 35% | 13.0 |
| | S | 20.8% | S | 15 | |
| | BA | 73.4% | BA | 30% | |
| | 1,4BDDA | 2.9% | BMA | 25.7% | |
| | AM | 2.9% | HBA | 24.3% | |

-continued

| Grafted Polymer Microparticle | | % Solids |
|---|---|---|
| | HPMA | 5 |

S - Styrene
BA - Butyl acetate
1,4BDDA - 1,4-Butane diol dimethacrylate
AM - Allyl methacrylate
ETMA - Ethyl methacrylate
MMA - Methyl methacrylate
LMA - Lauryl methacrylate
HEA - Hydroxy ethyl acrylate
HPMA - Hydroxy propylmethacrylate Each of the above microparticle polymer dispersions was separately used in the base coating composition described in Example 1. Each of the resulting compositions was sprayed onto primed steel substrate and top-coated with a clear composition as described in Example 1 and baked using the same conditions. In each case the resulting finish had good gloss and appearance and is acceptable as an automotive and truck finish.

We claim:

1. Crosslinked polymer microparticles useful as a rheology control additive for coating compositions and having a particle size of about 0.1-5 microns consisting essentially of a core of polymerized monomers selected from the group consisting of styrene, alkyl methacrylate having 1-12 carbons in the alkyl group, alkyl acrylate having 1-12 carbon atoms in the alkyl group and mixtures thereof and about 0.1-5% by weight of a crosslinking monomer of an alkylene glycol dimethacrylate or diacrylate each having 1-8 carbon atoms in the alkyl group, and about 0.1-5% by weight of allyl methacrylate or allyl acrylate; said polymer having a weight average molecular weight of about 500,000 to 5,000,000 and having polymeric chains grafted to the core through residual allyl groups; wherein the chains have a weight average molecular weight of less than 20,000 and consist essentially of polymerized monomers selected from the group consisting of styrene, alkyl methacrylate having 1-12 carbons in the alkyl group, alkyl acrylate having 1-12 carbons in the alkyl group and mixtures thereof and hydroxy containing monomers of a hydroxy alkyl acrylate or a hydroxy alkyl methacrylate.

2. The crosslinked microparticles of claim 1 in which the core comprises about 40-80% by weight of the microparticle and the chains comprise about 20-60% by weight of the microparticle and have a weight average molecular weight of about 3,000-18,000.

3. The crosslinked microparticles of claim 2 in which the core consists essentially of polymerized monomers of methyl methacrylate, butyl methacrylate, styrene, 1,4-butane diol dimethacrylate and allyl methacrylate and the chains grafted to the core consist essentially of polymerized monomers of styrene, ethyl methacrylate, lauryl methacrylate and hydroxy ethyl acrylate.

4. The crosslinked microparticles of claim 2 in which the core consists essentially of polymerized monomers styrene, butyl acrylate, butane diol dimethacrylate and allyl methacrylate and the chains grafted to the core consist essentially of polymerized monomers of methyl methacrylate, ethyl methacrylate, lauryl methacrylate and hydroxy ethyl acrylate.

5. The crosslinked microparticles of claim 2 in which the core consists essentially of polymerized monomers of styrene, butyl acrylate, butane diol dimethacrylate and allyl methacrylate and the chains grafted to the core consist essentially of polymerized monomers of styrene, butyl acrylate, butyl methacrylate, hydroxy ethyl acrylate and hydroxy propyl methacrylate.

* * * * *